United States Patent
Chambers et al.

(10) Patent No.: US 7,264,029 B1
(45) Date of Patent: Sep. 4, 2007

(54) FLAIL PAN FOR DELIMBING AND DEBARKING APPARATUS

(75) Inventors: Eric B. Chambers, Ackerman, MS (US); Clifton K. Hudson, Louisville, MS (US)

(73) Assignee: Chambers Delimbinator, Inc., Ackerman, MS (US)

( * ) Notice: Subject to any disclaimer, the term of this patent is extended or adjusted under 35 U.S.C. 154(b) by 0 days.

(21) Appl. No.: 11/433,519

(22) Filed: May 12, 2006

Related U.S. Application Data

(60) Provisional application No. 60/680,562, filed on May 13, 2005.

(51) Int. Cl.
*B27L 1/00* (2006.01)
*A01G 23/095* (2006.01)

(52) U.S. Cl. .............................. 144/208.7; 144/24.13; 241/193

(58) Field of Classification Search ............... 144/340, 144/341, 208.1, 208.4, 208.5, 208.7–208.9; 241/193
See application file for complete search history.

(56) References Cited

U.S. PATENT DOCUMENTS

| | | | | |
|---|---|---|---|---|
| 4,640,325 A | * | 2/1987 | Vaders ................... | 144/208.7 |
| 4,690,187 A | * | 9/1987 | Schmidt .................... | 144/340 |
| 4,787,431 A | | 11/1988 | Demlow | |
| 4,989,655 A | | 2/1991 | Peterson et al. | |
| 5,322,104 A | * | 6/1994 | Morey et al. ............... | 144/341 |
| 5,862,846 A | | 1/1999 | Chambers | |

* cited by examiner

*Primary Examiner*—Shelley Self
(74) *Attorney, Agent, or Firm*—Ian C. McLeod

(57) ABSTRACT

A flail pan for use with a delimbing and debarking apparatus. The flail pan has a first section which extends from the first side opening of the apparatus beneath the first flail and a center section which is spaced vertically and horizontally between the first and second flails. A second section of the flail pan slopes away from the center section downward toward the second side opening of the apparatus.

9 Claims, 4 Drawing Sheets

FLAIL PAN FOR DELIMBING AND DEBARKING APPARATUS

CROSS-REFERENCE TO RELATED APPLICATIONS

This application claims the benefit of U.S. Provisional Application No. 60/680,562, filed May 13, 2005.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a flail pan for a delimbing and debarking apparatus. In particular, the present invention relates to a flail pan which has an elevated center section which helps to guide trees through the delimbing and debarking apparatus.

(2) Description of the Related Art

In the past, the flail pans of debarking and delimbing apparatuses extended from a low point at the infeed side opening beneath the first flail at a constant angle to a high point adjacent the outfeed side opening. However, these flail pans had several disadvantages. First, the flail pans did not allow for easily and efficiently feeding the trees into the apparatus from both directions. In addition, due to the fact that the high point of the flail pan was adjacent the outfeed side opening, when a tree was fed into the apparatus, a majority of the weight of the tree rested on the first flail drum shaft. The weight of the tree on the first flail drum shaft increased the wear on the first flail.

Debarking and delimbing apparatuses having an end opening and side openings are known in the art. Illustrative are U.S. Pat. Nos. 4,787,431 to Demlow; 4,989,655 to Peterson et al and 5,862,846 to Chambers. The patents show debarking and delimbing apparatuses having upper and lower flails located between the side openings of the apparatus. Trees are dragged into the apparatus from one side opening between the upper and lower flails and out of the apparatus through the other side opening. The end opening of the apparatus allows for use of a tree skidder or boom truck to move the tree through the apparatus.

There remains the need for a flail pan for a debarking and delimbing apparatus which has an elevated center section which helps to guide the trees through the apparatus and reduces wear on the first flail and increases the versatility and efficiency of the apparatus.

SUMMARY OF THE INVENTION

The present invention is a flail pan for a delimbing and debarking apparatus which assists the flow of trees through the apparatus, which reduces the wear on the lower flail of the apparatus and which positions the tree between the flails to increase the efficiency of the apparatus. The flail pan of the present invention has a first section adjacent the infeed side opening or first side opening. The first section angles downward from the side opening and beneath the first flail. At a point beyond the first flail, the first section angles upward toward a center section. The center section is spaced horizontally and vertically between the first and second flails. The center section can have a flat surface to assist in supporting the trees. The second section extends downward at an angle from the center section to the outfeed opening or second side opening.

The flail pan of the present invention reduces the wear on the first flail drum shaft and reduces jamming of the apparatus by allowing debris to more easily slide out of the outfeed side opening of the apparatus. Reducing the amount of debris in the apparatus also reduces chain wear of the flails thus, allowing for longer chain life. Moving the weight of the tree off of the first flail drum shaft and toward the second flail increases the effectiveness of the flail chains which results in better fuel economy and less stress on the engines of the apparatus which results in better service and greater longevity from the engines. The flail pan of the present invention also enables the trees to be fed from either direction thus increasing the versatility of the apparatus.

The present invention relates to a flail pan for a delimbing and debarking apparatus, the apparatus having a top portion and a bottom portion with a first flail and a second flail therebetween, which comprises: a first section adjacent the first flail; a second section adjacent the second flail; and a center section extending between the first and second sections and positioned between the first and second flails of the apparatus wherein the first section angles away from the center section toward the bottom portion of the apparatus in a direction away from the second section.

Further, the present invention relates to a flail pan for a delimbing and debarking apparatus, the apparatus having a first side and a second side with a first flail and a second flail spaced between the sides with the first flail adjacent the first side and the second flail spaced between the first flail and the second side, which comprises: a first section adjacent the first side; a second section adjacent the second side; and a center section spaced between the first and second sections and spaced apart from a bottom portion of the apparatus a distance greater than a distance of the first flail from the bottom portion and less than a distance of the second flail from the bottom portion.

Still further, the present invention relates to a delimbing and debarking apparatus having a top portion and a bottom portion with a first flail and a second flail, the improvement which comprises: a flail pan mounted on the bottom portion and having a first section and a second section with a center section extending therebetween wherein the center section is spaced between the first and second flails, wherein the first flail has a drum shaft spaced apart from the bottom portion and wherein the center section is spaced apart from the bottom portion toward the top portion a distance greater than a distance the drum shaft of the first flail is spaced apart from the bottom portion toward the top portion.

The substance and advantages of the present invention will become increasingly apparent by reference to the following drawings and the description.

DETAILED DESCRIPTION OF THE PREFERRED EMBODIMENTS

Figure 1:
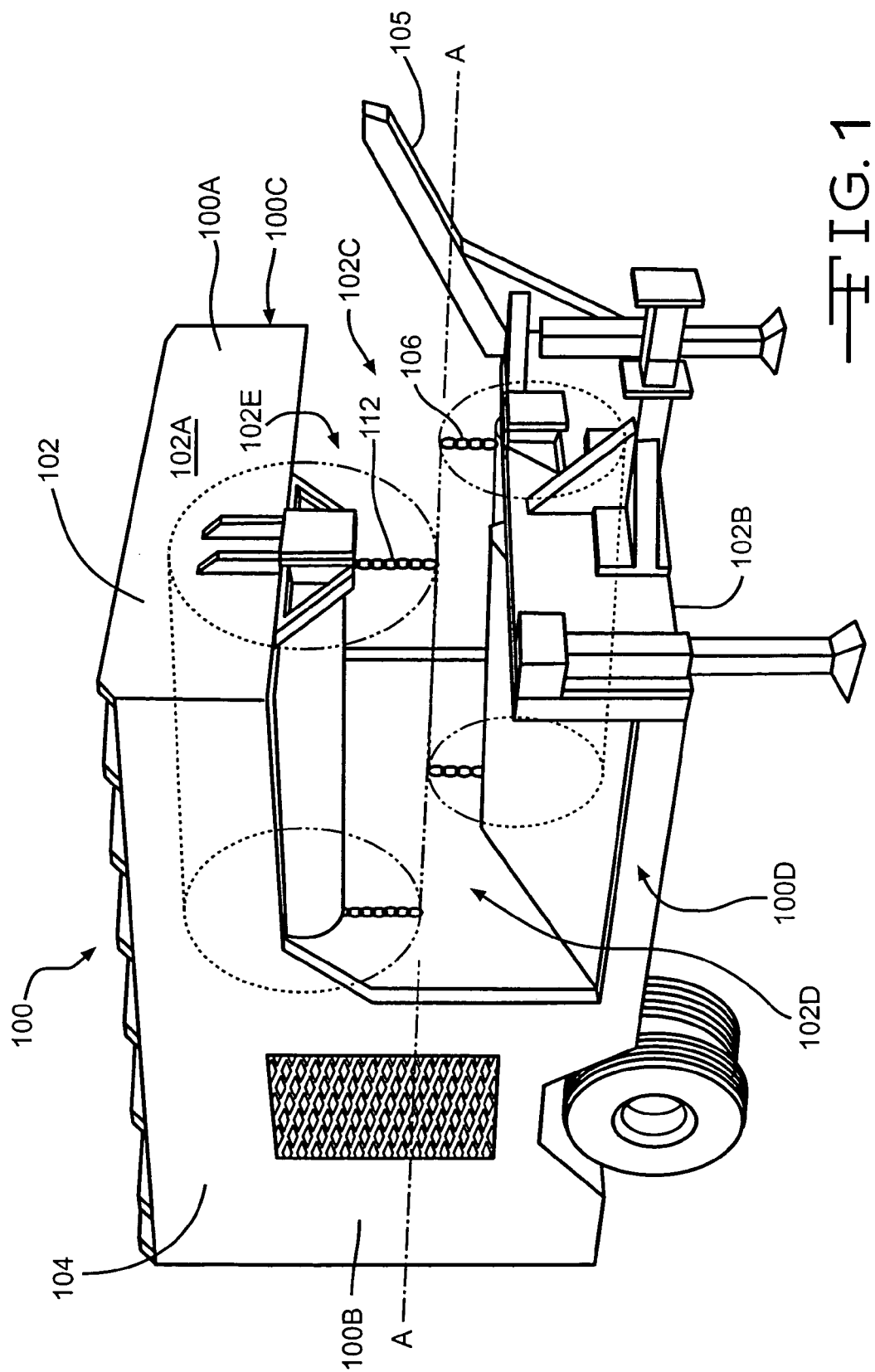
FIG. 1 is a perspective view of the delimbing and debarking apparatus 100 showing the flail pan 10 at the second side opening 102D of the apparatus 100.

The present invention relates to a flail pan 10 for a delimbing and debarking apparatus 100 also known as a flail chain delimber which is used to remove bark and limbs from a tree 200. The delimbing and debarking apparatus 100 is similar to those known in the art. In one (1) embodiment, the apparatus 100 is portable.

The delimbing and debarking apparatus 100 has a first end 100A and a second end 100B with a first side 100C and a second side 100D extending between the ends 100A and 100B. The apparatus 100 includes a first section 102 adjacent the first end 100A and a second section 104 adjacent the second end 100B.

Figure 2:
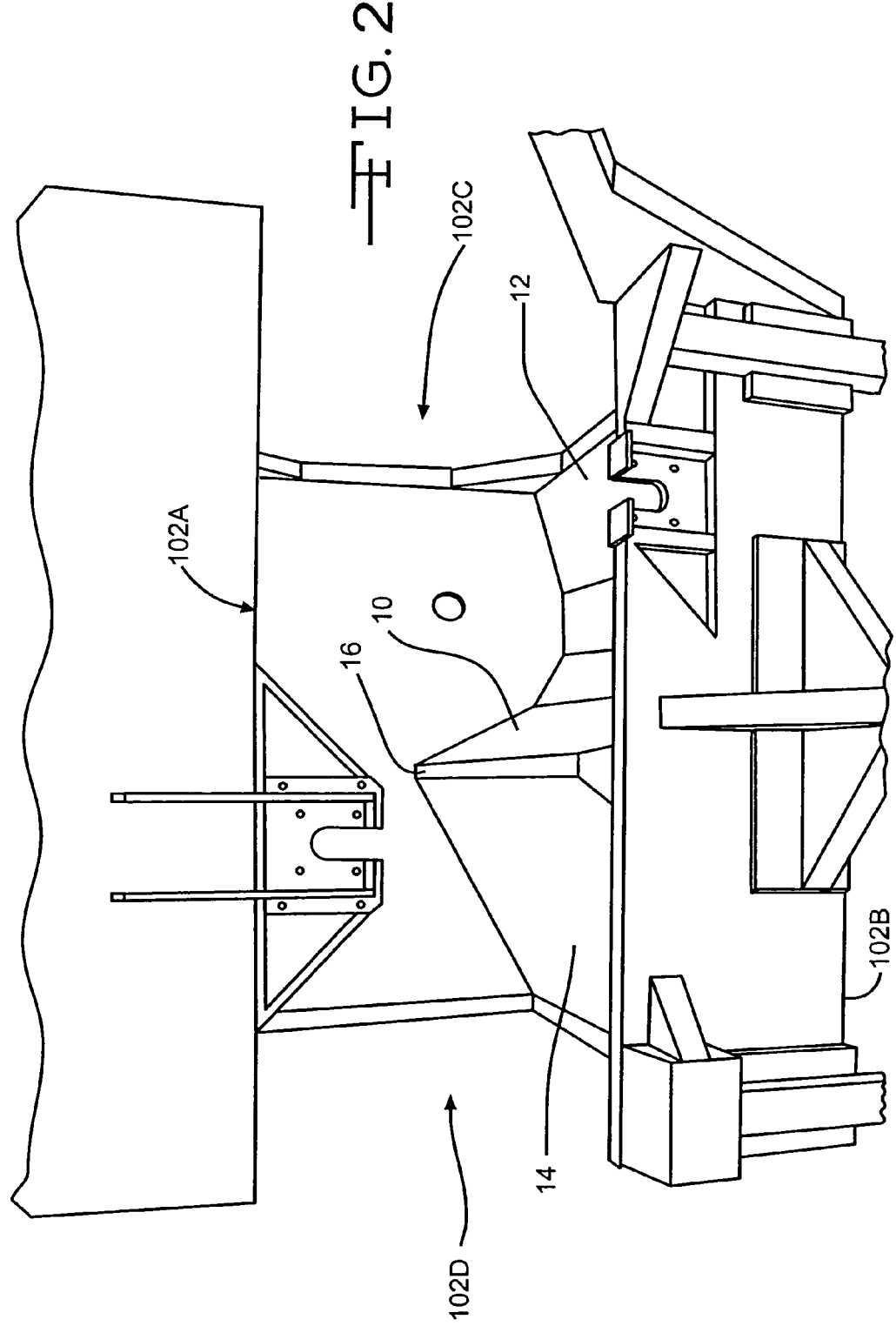
FIG. 2 is a partial front view of the delimbing and debarking apparatus 100 without the flails 106 and 112 showing the flail pan 10.

The first section 102 of the apparatus 100 has the delimbing and debarking means. The second section 104 includes the means for operating the delimbing and debarking means such as the engines and controls. The first section 102 has a top portion 102A spaced apart from a bottom portion 102B forming a first side opening 102C adjacent the first side 100C of the apparatus 100, a second side opening 102D adjacent the second side 100D of the apparatus 100 and an end opening 102E extending between the sides 100C and 100D of the apparatus 100 at the first end 100A of the apparatus 100. The side openings 102C and 102D and end opening 102E of the first section 102 allow access to the space between the top and bottom portions 102A and 102B of the first section 102. In one (1) embodiment, the first side opening 102C adjacent the first side 100C of the apparatus 100 is the infeed side opening and the second side opening 102D adjacent the second side 100D of the delimbing and debarking apparatus 100 is the outfeed side opening. However, it is understood that the tree can be fed into the apparatus 100 in the opposite direction from the outfeed side opening to the infeed side opening. In one (1) embodiment, when looking directly at the first end 100A of the delimbing and debarking apparatus 100, the infeed side opening or first side opening 102C is located on the right side and the outfeed side opening or second side opening 102D is located on the left side (FIG. 2). A top wall and a bottom wall mounted on the top and bottom portions 102A and 102B, respectively of the first section 102 form the first end 100A of the delimbing and debarking apparatus 100. In one (1) embodiment, a feed arm 105 is mounted on the first end 101A of the delimbing and debarking apparatus 100 adjacent the infeed side opening 102C. The feed arm 105 is similar to the feed arm disclosed in U.S. Pat. No. 5,862,846 to Chambers which is incorporated herein by reference in its entirety. It is understood that the feed arm 105 can be positioned adjacent the second or outfeed opening 102D to allow trees 200 to be fed into the apparatus 100 from the opposite side.

The delimbing and debarking means in the first section 102 includes first and second flails 106 and 112 and a flail pan 10. The first and second flails 106 and 112 are mounted to the top and bottom portions 102A and 102B, respectively of the first section 102 in the space between the top and bottom portions 102A and 102B. The flails 106 and 112 include a drum shaft 108 and 114 and chains 110 and 116. The flails 106 and 112 extend completely across the first section 102 of the apparatus 100. The drum shafts 108 and 114 of the flails 106 and 112 extend essentially parallel to the longitudinal axis A-A of the apparatus 100 as formed by the first and second ends 100A and 100B of the apparatus 100. The chains 110 and 116 of the flails 106 and 112 extend into the space between the top and bottom portions 102A and 102B of the first section 102. In one (1) embodiment, the first flail 106 is mounted adjacent the first side opening 102C and the second flail 112 is mounted between the first flail 106 and the second side opening 102D. In one (1) embodiment, the diameter of the first flail 106 with the chains 110 in the fully extended position is less than the diameter of the second flail 112 with the chains 116 in the fully extended position. However, it is understood that the first and second flails 106 and 112 can have a variety of sizes.

The flail pan 10 is formed in the bottom portion 102B of the first section 102 of the apparatus 100. The flail pan 10 extends the full width of the first section 102 of the delimbing and debarking apparatus 100 between the first and second sides 100C and 100D and the full length of the first section 102 from the first end 100A of the delimbing and debarking apparatus 100 to the second section 104 of the delimbing and debarking apparatus 100. The flail pan 10 has a first section 12 and a second section 14 connected by a center section 16. The first section 12 extends from the first side opening 102C of the first section 102 under the first flail 106 and then upward toward the center section 16 and toward the second flail 112. In one (1) embodiment, the first section 12 of the flail pan 10 extends downward from the first side opening 102C to a position below the first flail 106. In one (1) embodiment, a portion of the flail pan 10 directly beneath the shaft of the first flail 106 is flat or essentially parallel to the bottom portion 102B of the first section 102. The first section 12 of the flail pan 10 extends upward toward the top portion 102A of the first section 102 and toward the center section 16, once the first section 12 is past the drum shaft 108 of the first flail 106. The first section 12 of the flail pan 10 can have a variety of shapes. The first section 12 is spaced apart from the drum shaft 108 of the first flail 106 at least the length of the chains 110 of the first flail 106 so that when the chains 110 are fully extended, the chains 110 do not contact the flail pan 10. In one (1) embodiment, the first section 12 of the flail pan 10 is spaced apart from the end of the fully extended chains 110 to prevent the chains 110 from contacting debris sitting on the first section 12 of the flail pan 10.

The center section 16 of the flail pan 10 is located between the first and second sections 12 and 14 of the flail pan 10 and can be located at different positions horizontally between the first and second sides 100C and 100D of the delimbing and debarking apparatus 100. In one (1) embodiment, the center section 16 of the flail pan 10 is spaced between the first and second flails 106 and 112. In one (1) embodiment, the center section 16 is spaced closer to the second flail 112 than to the first flail 106.

Figure 3:
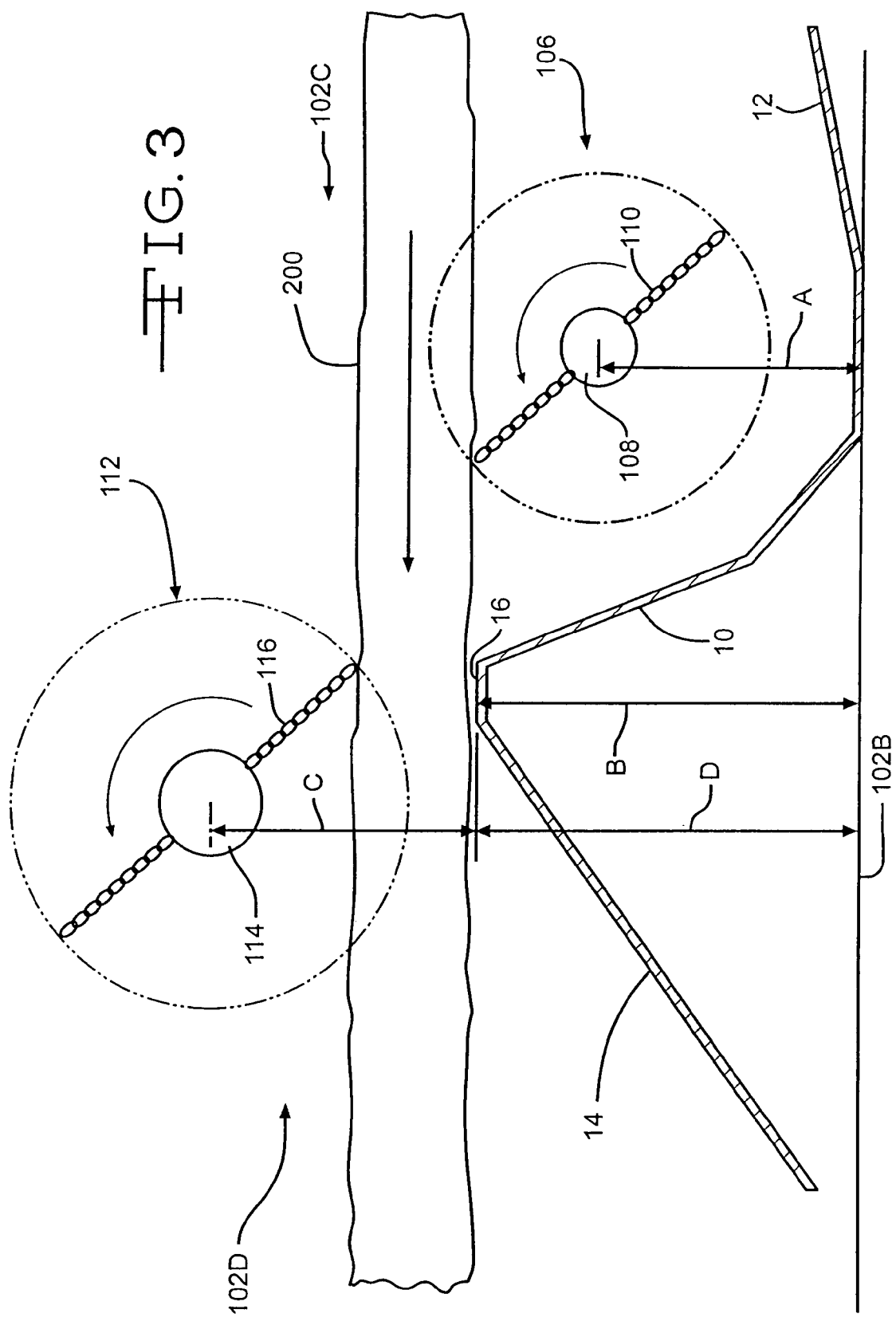
FIG. 3 is a schematic view of the flail pan 10 and the upper and lower flails 106 and 112 with a tree 200 moving between the flails 106 and 112.

The center section 16 is spaced above the bottom portion 102B of the first section 102 a distance such that when the trees 200 are fed into the delimbing and debarking apparatus 100, the trees 200 contact and rest on the center section 16 of the flail pan 10. The trees 200 are positioned so that the chains 110 and 116 of the first and second flails 106 and 112 are nearly fully extended in length when they contact the trees 200. In one (1) embodiment, the center section 16 has a height or is spaced above the bottom portion 102B of the first section 102 a distance greater than the distance between the drum shaft 108 of the first flail 106 and the bottom portion 102 and less than the distance between the drum shaft 114 of the second flail 112 and the bottom portion 102B (FIG. 3). Thus, the center section 16 is vertically spaced between the drum shafts 108 and 114 of the first and second flails 106 and 112. The center section 16 is spaced apart from the drum shaft 114 of the second flail 112 at least the length of the chains 116 of the second flail 112 so that when the chains 116 are in the fully extended position, the chains 116 do not contact the flail pan 10. In one (1) embodiment, the center section 16 has an essentially flat top which extends essentially horizontal to the ground surface or the bottom portion 102B of the first section 102. In one (1) embodiment, the flat top of the center section 16 has a width of about 4 inches (101.6 mm). In one (1) embodiment, a brace (not shown) is provided beneath the flail pan 10 to support the center section 16.

Figure 4:
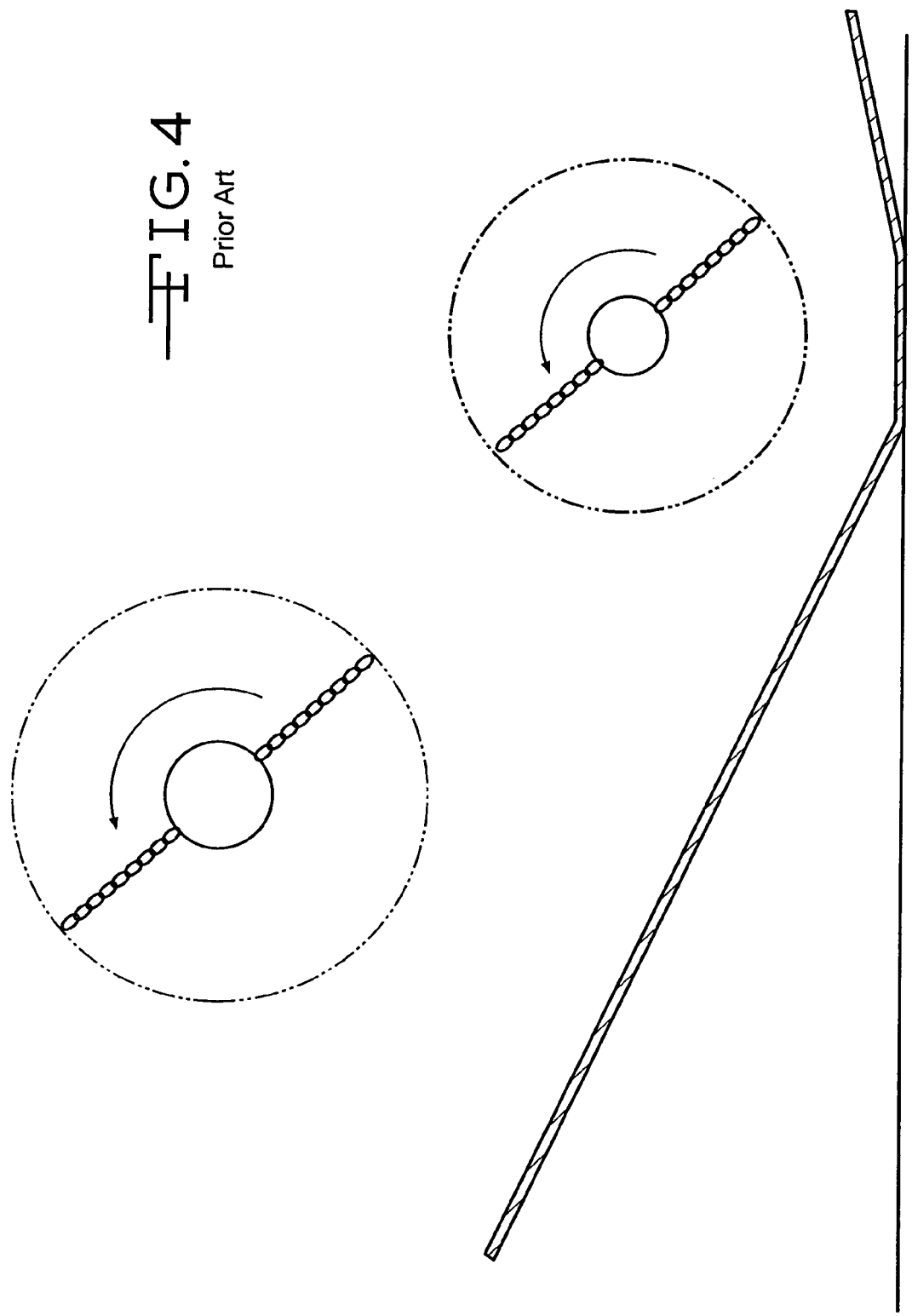
FIG. 4 is a schematic view of a flail pan 10 of the prior art.

In one (1) embodiment, the distance from the drum shaft 108 of the first flail 106 to the first section 12 of the flail pan 10 is greater than approximately 25.25 inches (641.35 mm). In one (1) embodiment, where the first flail 106 has 8 link chains, the first flail 106 is positioned at A about 23.0 inches (584 mm) from the bottom portion 102B of the first section 102 of the delimbing and debarking apparatus 100 without the flail pan 10 and about 27.0 inches (685.8 mm) inward from the first side 100C of the delimbing and debarking apparatus 100. In one (1) embodiment where the second flail 112 has 13 link chains, the drum shaft 114 of the second flail 112 is mounted about 60 inches (1524 mm) from the bottom (C+D) portion 102B of the first section 102 of the delimbing and debarking apparatus 100 without the flail pan 10 and about 66 inches (1676 mm) inward from the first side 100C of the delimbing and debarking apparatus 100 (FIG. 4). In this embodiment, the center section 16 has a height. B of approximately 30 inches (762 mm) from the bottom portion 102B of the first section 102 of the delimbing and debarking apparatus 100 without the flail pan 10 and is positioned approximately 56 inches (1422 mm) from the first side 100C of the delimbing and debarking apparatus 100. In one (1) embodiment, the distance C from the drum shaft 114 of the second flail 112 to the center section 16 is greater than approximately 32.25 inches (819 mm). In one (1) embodiment, the center section 16 extends and has a width of approximately 6 inches (152 mm).

The second section 14 of the flail pan 10 extends downward at an angle from the center section 16 to the second side 100D of the delimbing and debarking apparatus 100 or the second, outfeed side opening 102D. The slope of the second section 14 allows most debris to easily slide out of the apparatus 100 without user assistance. In one (1) embodiment, the second section 14 has a length of about 46 inches (1168 mm) and extends from a height of about 30 inches (762 mm) at the center section 16 to a height of about 8 inches (203 mm) adjacent the second side opening 102D. In this embodiment, the second section 14 slopes at an angle of approximately 29° from the second side opening to the center section 16. In one (1) embodiment, the flail pan 10 at the first side opening 102 is spaced essentially the same distance from the ground surface as the flail pan 10 at the second side opening 102D.

To use the debarking and delimbing apparatus 100, a tree 200 is grasped by a tree skidder or boom truck and positioned adjacent the first side opening 102C of the delimbing and debarking apparatus 100. The tree 200 is then dragged through the first section 102 of the delimbing and debarking apparatus 100. As the tree 200 moves through the first section 102, the tree 200 passes between the first and second flails 106 and 112 so that the chains 110 and 116 of the flails 106 and 112 contact the tree 200 and remove the limbs and bark from the tree 200. As the tree 200 is moved through the first section 102, the tree 200 rests upon and is supported by the center section 16 of the flail pan 10. In one (1) embodiment the top portion 102A of the first section 102 of the delimbing and debarking apparatus 100 adjacent the outfeed or second side opening 102D has a height such as to prevent the tree 200 from being lifted beyond a point where the tree 200 is no longer supported by the center section 16 but rather is in contact with the drum shaft 114 of the second flail 112. Thus, the position of the top portion 102A prevents pressure from being exerted on the second flail 112 by the tree 200, thus reducing wear on the second flail 112. The center section 16 is positioned above the drum shaft 108 of the first flail 106, so that the tree 200 is moved upward away from and off of the drum shaft 108 of the first flail 106 and the majority of the weight of the tree 200 is supported by the center section 16 of the flail pan 10. Reducing the weight on the drum shaft 108 of the first flail 106 reduces the wear on the drum shaft 108 and on the drum shaft bearings and extends the life of the first flail 106. Reducing the weight on the first flail 106 also allows the first flail 106 to rotate more freely which reduces the amount of energy needed to rotate the first flail 106. The height of the center section 16 also helps to correctly position the tree 200 between the first and the second flails 106 and 112 so that when the chains 110 and 116 of the flails 106 and 112 contact the tree 200, the chains 110 and 116 are in a nearly, fully extended position. The flails 106 and 112 are most efficient in removing the limbs and bark when the chains 110 and 116 are in the nearly, fully extended position.

As the tree 200 is delimbed and debarked, debris is formed. The position of the center section 16 between the first and second flails 106 and 112 and the shape of the first and second sections 12 and 14 of the flail pan 10, allow the debris to easily slide out of the delimbing and debarking apparatus 100. Removing the debris from the flail pan 10 and from adjacent the flails 106 and 112 reduces the wear on the flail chains 110 and 116 since the flail chains 110 and 116 do not contact the debris during use. Furthermore, the flails 106 and 112 are able to rotate without impedance until the chains 110 and 116 contact the tree 200. Consequently, removal of the debris also improves the effectiveness of the flail chains 110 and 116. When the chains 110 and 116 strike the tree 200, the chains 110 and 116 strike with maximum force and thus, perform the delimbing and debarking functions more efficiently.

The position and height of the center section 16 allows the trees 200 to be fed from either side opening 102A or 102B of the first section 102. Under standard usage, the trees 200 are fed in a counter-clockwise motion from the first side opening 102C to the second side opening 102D. Thus, the trees 200 move past the first flail 106 and then past the second flail 112. However, the position of the center section 16 toward the center of the first section 102 between the first and second flails 106 and 112 allows the trees 200 to be supported between the flails 106 and 112 regardless of which direction the trees 200 are fed into the delimbing and debarking apparatus 100. Thus, the trees 200 can be fed from the second side opening 102D or outfeed side to the first side opening 102C or infeed side without changing the flail pan 10 or the flails 106 and 112.

It is intended that the foregoing description be only illustrative of the present invention and that the present invention be limited only by the hereinafter appended claims.

We claim:

1. In a delimbing and debarking apparatus having a top portion and a bottom portion with a first flail and a second flail therebetween, the improvement in a flail pan mounted on the bottom portion, which comprises:
   (a) a first section adjacent the first flail;
   (b) a second section adjacent the second flail; and
   (c) a center section extending between the first and second sections and positioned between the first and second flails of the apparatus so as to provide a rest for a tree during the delimbing and debarking, wherein the first section angles away from the center section toward the bottom portion of the apparatus in a direction away from the second section which also angles away from the center section toward the bottom portion of the apparatus.

2. The apparatus of claim 1 wherein the second section angles away from the center section toward the bottom portion of the apparatus in a direction away from the first section.

3. The apparatus of claim 1 wherein a distance of the center section from the bottom portion of the apparatus is greater than a distance of a drum shaft of the first flail from the bottom portion of the apparatus and less than a distance of a drum shaft of the second flail from the bottom portion of the apparatus.

4. The apparatus of claim 1 wherein the apparatus has a first and second side with the first and second flails spaced apart horizontally between the first and second sides with the first flail adjacent the first side of the apparatus and the second flail spaced between the first flail and the second side of the apparatus and wherein the center section is spaced between the first and second sides of the apparatus and between the first and second flails.

5. A delimbing and debarking apparatus having a first side and a second side with a first flail and a second flail spaced between the sides with the first flail adjacent the first side and the second flail spaced between the first flail and the second side, the improvement in a flail pan on a bottom portion of the apparatus, which comprises:
   (a) a first section adjacent the first side;
   (b) a second section adjacent the second side; and
   (c) a center section spaced between the first and second sections and spaced apart from a bottom portion of the apparatus, so as to provide a rest for a tree during the delimbing and debarking, a distance from the bottom portion greater than a distance a first drum shaft of the first flail from the bottom portion and less than a distance of a second drum shaft of the second flail from the bottom portion.

6. The apparatus of claim 5 wherein the center section is spaced between the first and second sides of the apparatus and between the first and second flails.

7. A delimbing and debarking apparatus having a top portion and a bottom portion with a lower first flail adjacent an infeed side of the apparatus and an upper second flail towards an outfeed side of the apparatus so that the lower and upper flails together can delimb and debark a tree, the improvement which comprises:
   a flail pan mounted on the bottom portion below the lower flail and having a first section and a second section with a center section extending upwardly therebetween the first and second sections so as to provide a rest for the tree, wherein the center section is spaced apart from and between the first and second flails, wherein the first flail has a drum shaft spaced apart from the bottom portion and wherein the center section is spaced apart from the bottom portion toward the top portion a distance greater than a distance of a drum shaft of the first flail is spaced apart from the bottom portion toward the top portion.

8. The apparatus of claim 7 wherein the second flail has a drum shaft which is mounted adjacent the top portion and wherein the center section is spaced apart from the top portion toward the bottom portion a distance greater than a distance of a drum shaft of the second flail is spaced apart from the top portion toward the bottom portion.

9. The apparatus of claim 7 wherein the flails both rotate in the same direction towards movement of the tree through the apparatus.

* * * * *

UNITED STATES PATENT AND TRADEMARK OFFICE
CERTIFICATE OF CORRECTION

PATENT NO. : 7,264,029 B1  Page 1 of 1
APPLICATION NO. : 11/433519
DATED : September 4, 2007
INVENTOR(S) : Eric B. Chambers and Clifton K. Hudson It is certified that error appears in the above-identified patent and that said Letters Patent is hereby corrected as shown below:

Column 3, line 52, "101A" should be --100A--.

Signed and Sealed this

Twenty-sixth Day of February, 2008

JON W. DUDAS
*Director of the United States Patent and Trademark Office*

UNITED STATES PATENT AND TRADEMARK OFFICE
CERTIFICATE OF CORRECTION

PATENT NO.         : 7,264,029 B1                                    Page 1 of 1
APPLICATION NO.    : 11/433519
DATED              : September 4, 2007
INVENTOR(S)        : Eric B. Chambers and Clifton K. Hudson It is certified that error appears in the above-identified patent and that said Letters Patent is hereby corrected as shown below:

Column 3, line 52, "101A" should be --100A--.

Signed and Sealed this

Fourth Day of March, 2008

JON W. DUDAS
*Director of the United States Patent and Trademark Office*